United States Patent
Kato et al.

(10) Patent No.: US 7,929,271 B2
(45) Date of Patent: Apr. 19, 2011

(54) FILM CAPACITOR

(75) Inventors: Yoshikuni Kato, Miyakonojo (JP);
Katsuo Koizumi, Miyakonojo (JP);
Kanji Machida, Yawata (JP)

(73) Assignee: Soshin Electric Co., Ltd., Saku (JP)

( * ) Notice: Subject to any disclaimer, the term of this patent is extended or adjusted under 35 U.S.C. 154(b) by 330 days.

(21) Appl. No.: 12/298,372

(22) PCT Filed: Apr. 26, 2007

(86) PCT No.: PCT/JP2007/059042
§ 371 (c)(1),
(2), (4) Date: Oct. 24, 2008

(87) PCT Pub. No.: WO2007/125986
PCT Pub. Date: Nov. 8, 2007

(65) Prior Publication Data
US 2009/0086402 A1     Apr. 2, 2009

(30) Foreign Application Priority Data

Apr. 28, 2006   (JP) ................................ 2006-126421

(51) Int. Cl.
*H01G 4/015* (2006.01)
*H01G 4/32* (2006.01)
*H01G 4/08* (2006.01)
(52) U.S. Cl. ....................... 361/273; 361/301.5; 361/323
(58) Field of Classification Search .................. 361/273, 361/301.5, 323, 327
See application file for complete search history.

(56) References Cited

U.S. PATENT DOCUMENTS

| 2,861,231 | A | * | 11/1958 | Robinson et al. | 361/304 |
| 4,504,884 | A | | 3/1985 | Vetter | |
| 4,719,537 | A | * | 1/1988 | Gizolme | 361/273 |
| 4,841,411 | A | * | 6/1989 | Kessler | 361/323 |
| 5,136,462 | A | * | 8/1992 | Steiner | 361/273 |
| 5,453,906 | A | * | 9/1995 | Doll | 361/273 |
| 5,933,947 | A | * | 8/1999 | Minamizawa et al. | 29/847 |
| 6,040,038 | A | | 3/2000 | Momose | |
| 6,111,743 | A | * | 8/2000 | Lavene | 361/301.5 |
| 6,370,008 | B1 | | 4/2002 | Vetter | |
| 6,370,208 | B1 | * | 4/2002 | Kuo et al. | 375/343 |
| 6,407,905 | B1 | * | 6/2002 | Connolly et al. | 361/303 |

(Continued)

FOREIGN PATENT DOCUMENTS

EP   0 438 344 A1   7/1991

(Continued)

OTHER PUBLICATIONS

U.S. Appl. No. 12/300,645, filed Nov. 13, 2008, Kato et al.

*Primary Examiner* — Eric Thomas
(74) *Attorney, Agent, or Firm* — Burr & Brown

(57) ABSTRACT

A first electrode pattern comprises a first lead-out electrode portion extending continuously along the longitudinal direction of a first dielectric film, a plurality of first capacitor electrode portions each extending from the first lead-out electrode portion almost perpendicularly to the first lead-out electrode portion, and second capacitor electrode portions which are disposed between the first capacitor electrode portions and connected thereto. The second capacitor electrode portions each have a plurality of first sections. Each first section is connected to one end surface and the other end surface extending along the width direction of the first dielectric film of the first capacitor electrode portions through a narrow first fuse portion.

7 Claims, 10 Drawing Sheets

U.S. PATENT DOCUMENTS

| | | | |
|---|---|---|---|
| 6,532,145 B1 * | 3/2003 | Carlen et al. | 361/508 |
| 6,631,068 B1 * | 10/2003 | Lobo | 361/273 |
| 6,754,065 B2 * | 6/2004 | Carlen et al. | 361/303 |
| 6,757,151 B2 * | 6/2004 | Eriksson et al. | 361/273 |
| 6,954,349 B2 * | 10/2005 | Shiota et al. | 361/303 |
| 7,027,286 B2 | 4/2006 | Shiota et al. | |
| 7,697,261 B2 * | 4/2010 | Okuno et al. | 361/273 |
| 2006/0171100 A1 * | 8/2006 | Uematsu et al. | 361/323 |

FOREIGN PATENT DOCUMENTS

| | | |
|---|---|---|
| EP | 1 868 216 A1 | 12/2007 |
| EP | 1 868 217 A1 | 12/2007 |
| JP | 132759 C | 11/1939 |
| JP | 41-011377 A1 | 6/1966 |
| JP | 57-024727 U1 | 2/1982 |
| JP | 57-040915 A1 | 3/1982 |
| JP | 60-076028 A1 | 5/1985 |
| JP | 02-121320 A1 | 5/1990 |
| JP | 03-077426 U1 | 8/1991 |
| JP | 05021270 A * | 1/1993 |
| JP | 05217799 A * | 8/1993 |
| JP | 05326322 A * | 12/1993 |
| JP | 06-302468 A1 | 10/1994 |
| JP | 06-310368 A1 | 11/1994 |
| JP | 07-263269 A1 | 10/1995 |
| JP | 08-288171 A1 | 11/1996 |
| JP | 2590357 B2 | 12/1996 |
| JP | 09-199371 A1 | 7/1997 |
| JP | 09-283366 A1 | 10/1997 |
| JP | 11-045819 A1 | 2/1999 |
| JP | 2002-504747 A1 | 2/2002 |
| JP | 2002-324719 A1 | 11/2002 |
| JP | 2004-134561 A1 | 4/2004 |
| JP | 3710873 B2 | 8/2005 |
| WO | 01/11637 A1 | 2/2001 |
| WO | 2004/034412 A1 | 4/2004 |

* cited by examiner

FILM CAPACITOR

FIELD OF THE INVENTION

The present invention relates to a film capacitor having a roll of a first electrode pattern and a second electrode pattern which confront each other with a dielectric film sandwiched therebetween, a first terminal electrically connected to one end of the roll, and a second terminal electrically connected to the other end of the roll, and more particularly to a film capacitor which has both a self-healing function and a self-protection mechanism.

BACKGROUND OF THE INVENTION

Film capacitors having both a self-healing function and a self-protection mechanism are disclosed in Patent Documents 1 through 4, for example.

The film capacitor disclosed in Patent Document 1 has a pair of capacitor electrodes which confront each other with a dielectric film sandwiched therebetween. At least one of the capacitor electrodes is formed by metal evaporation, and is divided into equally spaced or arbitrarily spaced intervals in the longitudinal direction of the film by a plurality of insulating grooves, thereby providing a plurality of segmented electrode banks. The segmented electrode banks comprise electrodes provided by a network of insulating grooves with a plurality of narrow current paths left therebetween.

The capacitor electrodes sandwiching the dielectric film serve as a metalized film having 2 to 20 independent small electrodes arrayed in the longitudinal direction of the film and a plurality of independent small electrodes arrayed in the transverse direction of the film. The metalized film is rolled into a roll, and metal is thermal-sprayed to opposite end faces of the roll to form terminal electrodes, thus producing a capacitor element. One or more capacitor elements are encased into the film capacitor.

The film capacitor disclosed in Patent Document 2 comprises a dielectric film and a metal-evaporated electrode disposed on the dielectric film. The metal-evaporated electrode has a plurality of divided electrodes arrayed in longitudinal and transverse directions thereof. The divided electrodes are segmented by non-electrode margins, and margin fuses having a fuse function are disposed in the margins. The margin fuses are superposed over margin fuses on upper and lower confronting electrodes.

The film capacitor disclosed in Patent Document 3 is a capacitor sheet which comprises a dielectric capacitor sheet having a metal thin film thereon and rolled into a capacitor roll in the traveling direction of the dielectric capacitor sheet. The film capacitor includes a metalized region which includes the metal thin film with divisions therein. The metal thin film includes partial divisions formed in the transverse direction to the traveling direction of the capacitor sheet.

The film capacitor disclosed in Patent Document 4 includes a pair of evaporated electrodes having divided electrodes connected parallel to each other through fuses and extending from a substantially transversely central region toward insulated margins in an effective electrode area providing a capacitance. Since the fuses and the divided electrodes are disposed closely to the insulated margins where reduced currents flow at positions away from components plated by thermal-sprayed metal, the heat produced by the fuses is reduced to lower a temperature rise.

Patent Document 1: Japanese Patent No. 3710873;
Patent Document 2: Japanese Laid-Open Patent Publication No. 09-199371;
Patent Document 3: Japanese Laid-Open Patent Publication No. 2002-504747 (PCT); and
Patent Document 4: Japanese Laid-Open Patent Publication No. 2004-134561.

SUMMARY OF THE INVENTION

With the film capacitors of the background art, the divided electrodes are directly connected by the very narrow fuses to lead-out electrodes that are electrically connected to the terminals of the film capacitor.

Therefore, when a current flows, the heat radiation path is narrow, the heat radiation efficiency is poor, and the temperature due to the heat tends to rise. For reducing the temperature due to the heat, it is the only option to lower the allowable current value. The film capacitors of the background art thus fail to find themselves usable in various applications.

The present invention has been made in view of the above problems. It is an object of the present invention to provide a film capacitor which has a sufficient heat radiation path, has both a self-healing function and a self-protection mechanism, and finds itself usable in various applications.

A film capacitor according to the present invention comprises a roll of a first electrode pattern and a second electrode pattern which confront each other with a dielectric film sandwiched therebetween, a first terminal electrically connected to one end of the roll, and a second terminal electrically connected to another end of the roll, wherein the first electrode pattern includes a first lead-out electrode extending continuously in a longitudinal direction of the dielectric film, a plurality of first capacitor electrodes extending substantially perpendicularly from the first lead-out electrode, and a plurality of second capacitor electrodes disposed between the first capacitor electrodes and connected to the first capacitor electrodes, the second electrode pattern includes a second lead-out electrode extending continuously in the longitudinal direction of the dielectric film, a plurality of third capacitor electrodes extending substantially perpendicularly from the second lead-out electrode, and a plurality of fourth capacitor electrodes disposed between the third capacitor electrodes and connected to the third capacitor electrodes, the first capacitor electrodes of the first electrode pattern and the fourth capacitor electrodes of the second electrode pattern are superposed one on the other with the dielectric film being sandwiched therebetween, and the second capacitor electrodes of the first electrode pattern and the third capacitor electrodes of the second electrode pattern are superposed one on the other with the dielectric film being sandwiched therebetween, the width of the fourth capacitor electrodes along the longitudinal direction of the dielectric film is greater than the width of the first capacitor electrodes along the longitudinal direction of the dielectric film, and the width of the second capacitor electrodes along the longitudinal direction of the dielectric film is greater than the width of the third capacitor electrodes along the longitudinal direction of the dielectric film, the first lead-out electrode of the first electrode pattern extends to a side edge of the dielectric film such that the first lead-out electrode is electrically connected to the first terminal, and the second lead-out electrode of the second electrode pattern extends to another side edge of the dielectric film such that the second lead-out electrode is electrically connected to the second terminal.

The first capacitor electrodes and the third capacitor electrodes can be effectively utilized as heat radiation paths. Accordingly, the film capacitor has sufficient heat radiation paths, has both a self-healing function and a self-protection mechanism, has an increased allowable current value, and finds itself usable in various applications.

In the present invention, the roll may comprise a first dielectric film with the first electrode pattern disposed on one side thereof and a second dielectric film with the second electrode pattern disposed on one side thereof, the first dielectric film and the second dielectric film being superposed one on the other such that the first electrode pattern and the second electrode pattern are kept out of contact with each other, and rolled together.

Further, in the present invention, the roll may comprise a dielectric film with the first electrode pattern disposed on one side thereof and the second electrode pattern disposed on another side thereof, and a spacer of a dielectric film with no electrode pattern disposed on either side thereof, the dielectric film and the spacer being superposed one on the other and rolled together.

Further, in the present invention, the dielectric film may have wavy side edges. The wavy side edges may be of a sine-wave shape or a shape similar to a triangular shape, a semicircular shape, or the like.

Further, in the present invention, the second capacitor electrodes of the first electrode pattern may be divided into at least one first section, the at least one first section may be connected by a narrow first fuse to at least one end face of the first capacitor electrodes which extends transversely across the dielectric film, the fourth capacitor electrodes of the second electrode pattern may be divided into at least one second section, and the at least one second section may be connected through a narrow second fuse to at least one end face of the third capacitor electrodes which extends transversely across the dielectric film.

Further, in the present invention, the first section may comprise at least two first small sections arrayed along the longitudinal direction of the dielectric film and connected through narrow third fuses, and the second section may comprise at least two second small sections arrayed along the longitudinal direction of the dielectric film and connected through narrow fourth fuses.

Further, in the present invention, a fifth fuse that is narrower than the first capacitor electrodes and wider than the first fuse may be disposed between the first lead-out electrode and the first capacitor electrodes of the first electrode pattern, and a sixth fuse that is narrower than the third capacitor electrodes and wider than the second fuse may be disposed between the second lead-out electrode and the third capacitor electrodes of the second electrode pattern.

As described above, the film capacitor according to the present invention has sufficient heat radiation paths, has both a self-healing function and a self-protection mechanism, and finds itself usable in various applications.

DETAILED DESCRIPTION OF THE INVENTION

Embodiments of film capacitors according to the present invention will be described below with reference to FIGS. 1 through 10.

Figure 1:
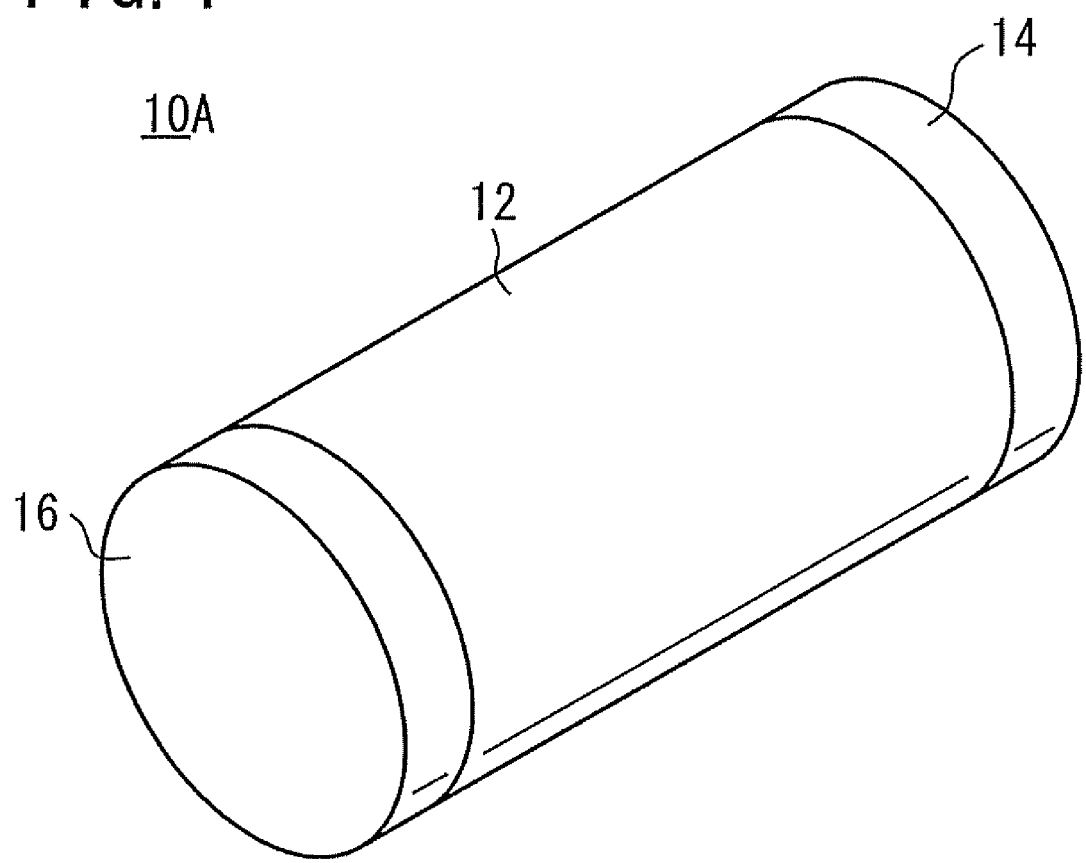
FIG. 1 is a perspective view showing an example of the outer shape of a first film capacitor.

As shown in FIG. 1, a film capacitor according to a first embodiment of the present invention (hereinafter referred to as "first film capacitor 10A") comprises a roll 12, a first terminal 14 electrically connected to an end of the roll 12, and a second terminal 16 electrically connected to the other end of the roll 12.

Figure 2:
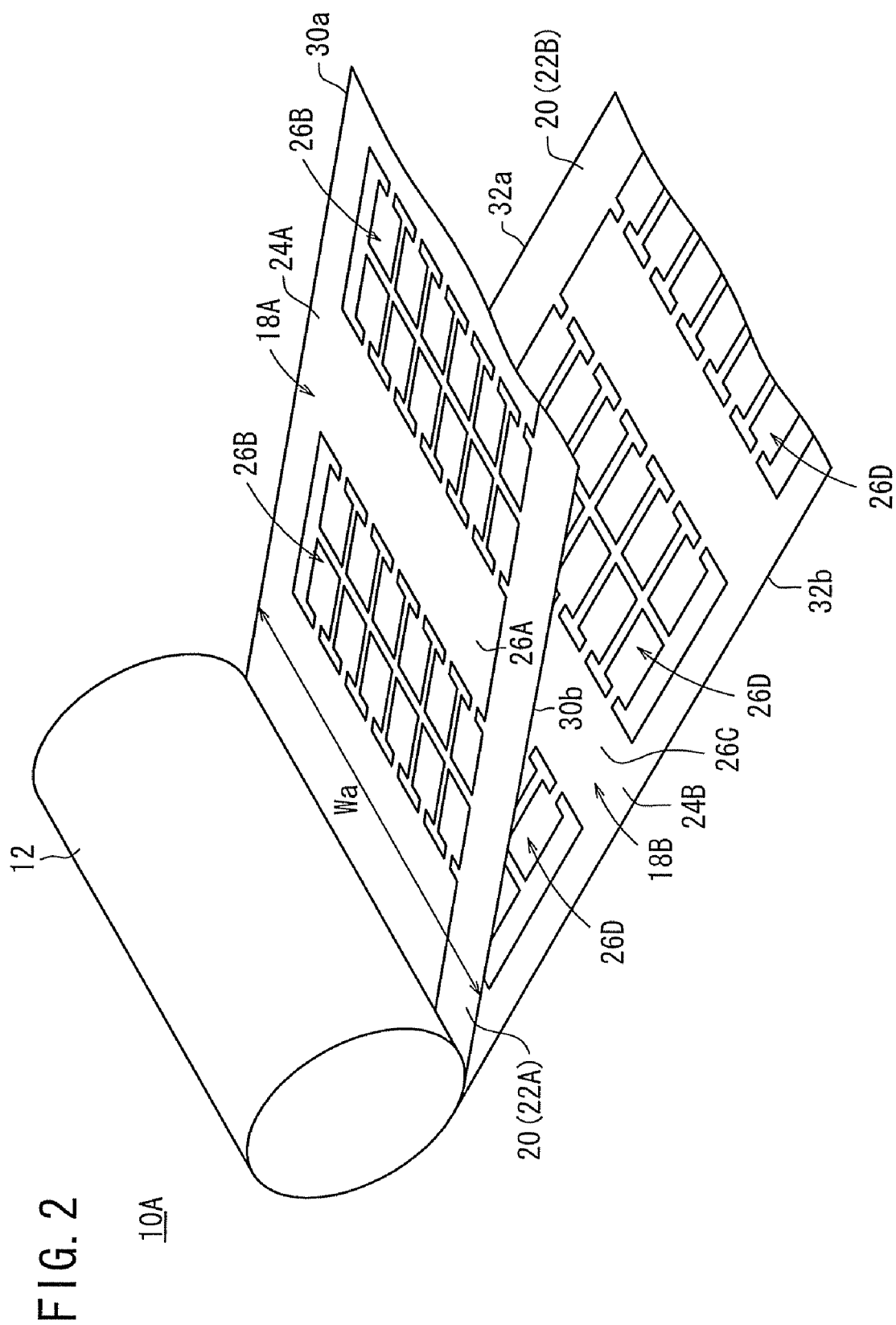
FIG. 2 is a perspective view, partly omitted from illustration, of the structure of a roll of the first film capacitor.

As shown in FIG. 2, the roll 12 includes a first electrode pattern 18A and a second electrode pattern 18B which are rolled in confronting relation to each other with a dielectric film 20 sandwiched therebetween.

Figure 3:
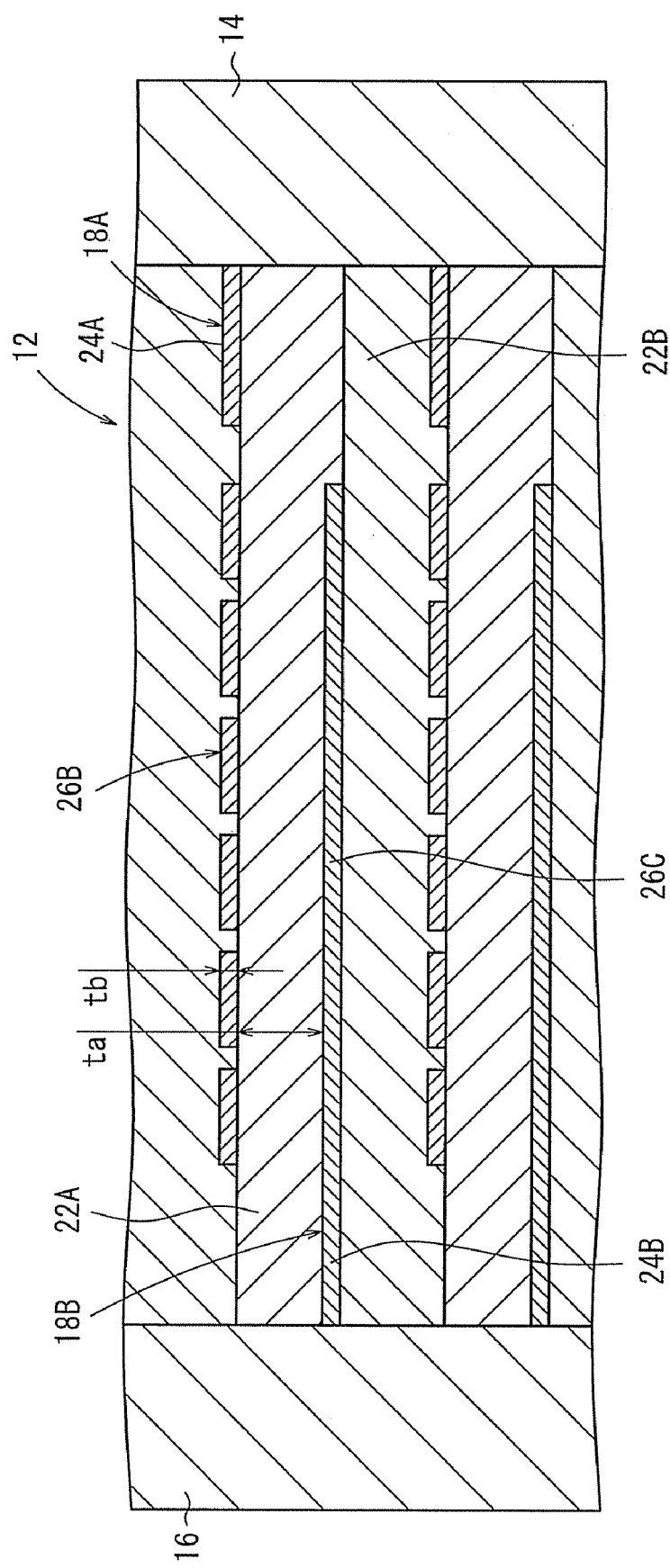
FIG. 3 is a cross-sectional view, partly omitted from illustration, of the structure of the first film capacitor.

As shown in FIGS. 2 and 3, the roll 12 of the first film capacitor 10A comprises a first dielectric film 22A with the first electrode pattern 18A disposed on one side thereof and a second dielectric film 22B with the second electrode pattern 18B disposed on one side thereof. The first dielectric film 22A and the second dielectric film 22B are superposed one on the other such that the first electrode pattern 18A and the second electrode pattern 18B are kept out of contact with each other, and are rolled together.

Each of the first dielectric film 22A and the second dielectric film 22B may be made of PP (polypropylene), PET (polyethylene terephthalate), PPS (polyphenylene sulfide), or the like. The first dielectric film 22A and the second dielectric film 22B have a width Wa (see FIG. 2) in the range from 10 to 200 mm and a thickness ta (see FIG. 3) in the range from 2.7 to 30 μm.

The first electrode pattern 18A and the second electrode pattern 18B may be made of aluminum, zinc, an alloy of aluminum and zinc, or the like. The first electrode pattern 18A and the second electrode pattern 18B should preferably have a thickness tb (see FIG. 3) which satisfies a surface resistance in the range from 1 to 20 ohms/mm$^2$, and may be in the range from 100 to 1000 Angstroms, for example.

The first film capacitor 10A has a capacitance value in the range from about several tens µF to several hundreds µF, a rated voltage of several hundreds V (DC), and a rated current of several tens A.

Figure 4:
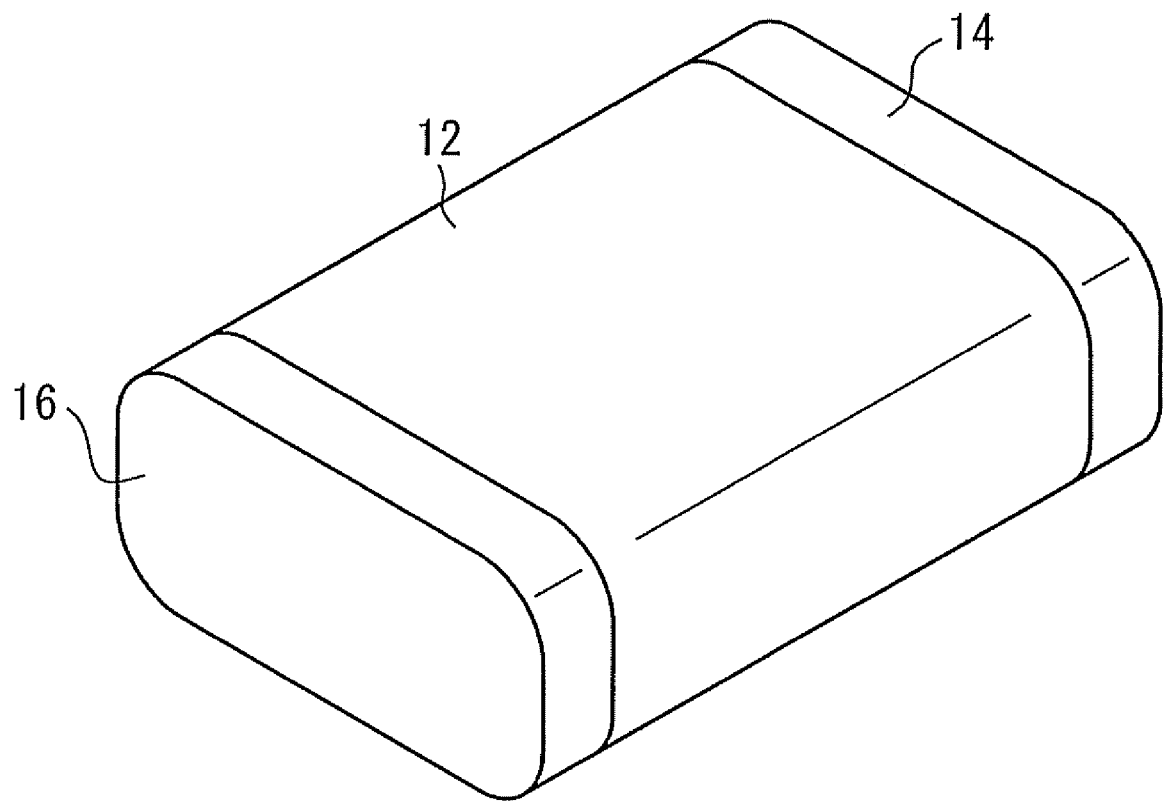
FIG. 4 is a perspective view showing another example of the outer shape of the first film capacitor.

The first film capacitor 10A is of a cylindrical shape as shown in FIG. 1 or a flat shape as shown in FIG. 4.

Figure 5A:
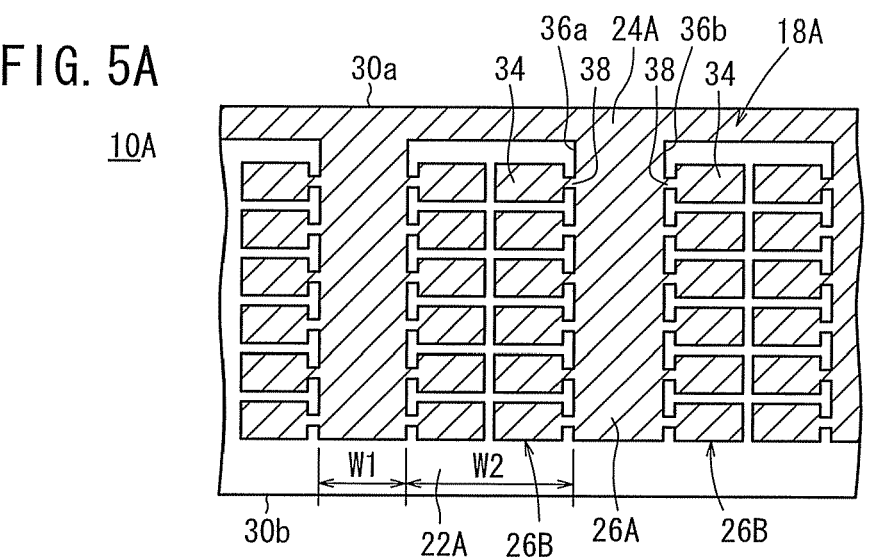
FIG. 5A is a plan view, partly omitted from illustration, of a first dielectric film and a first electrode pattern of the first film capacitor.

As shown in FIGS. 2 and 5A, the first electrode pattern 18A has a first lead-out electrode 24A extending continuously in the longitudinal direction of the first dielectric film 22A, a plurality of first capacitor electrodes 26A extending substantially perpendicularly from the first lead-out electrode 24A, and a plurality of second capacitor electrodes 26B disposed between the first capacitor electrodes 26A and connected to the first capacitor electrodes 26A.

Figure 5B:
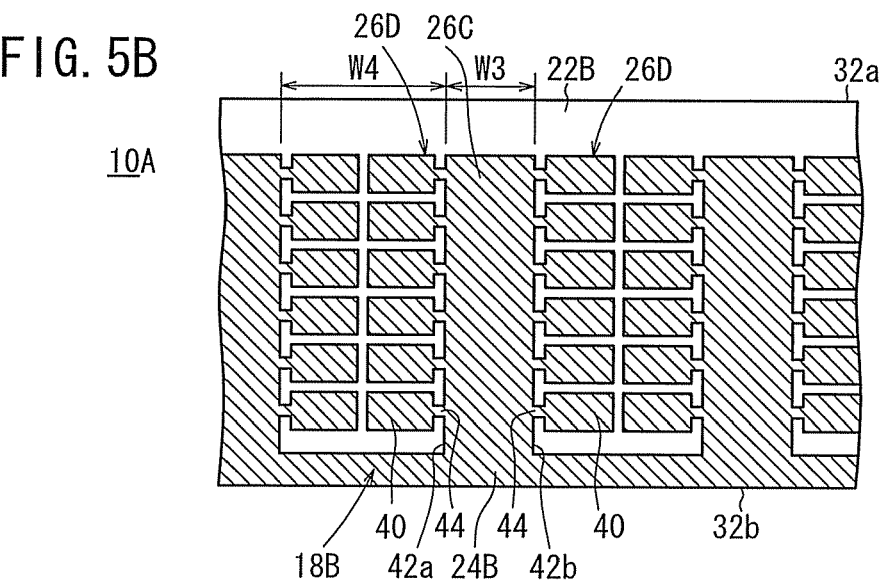
FIG. 5B is a plan view, partly omitted from illustration, of a second dielectric film and a second electrode pattern of the first film capacitor.

Similarly, as shown in FIGS. 2 and 5B, the second electrode pattern 18B has a second lead-out electrode 24B extending continuously in the longitudinal direction of the second dielectric film 22B, a plurality of third capacitor electrodes 26C extending substantially perpendicularly from the second lead-out electrode 24B, and a plurality of fourth capacitor electrodes 26D disposed between the third capacitor electrodes 26C and connected to the third capacitor electrodes 26C.

The width W4 of the fourth capacitor electrodes 26D along the longitudinal direction of the second dielectric film 22B is greater than the width W1 of the first capacitor electrodes 26A along the longitudinal direction of the first dielectric film 22A. The width W2 of the second capacitor electrodes 26B along the longitudinal direction of the first dielectric film 22A is greater than the width W3 of the third capacitor electrodes 26C along the longitudinal direction of the second dielectric film 22B.

Figure 5C:
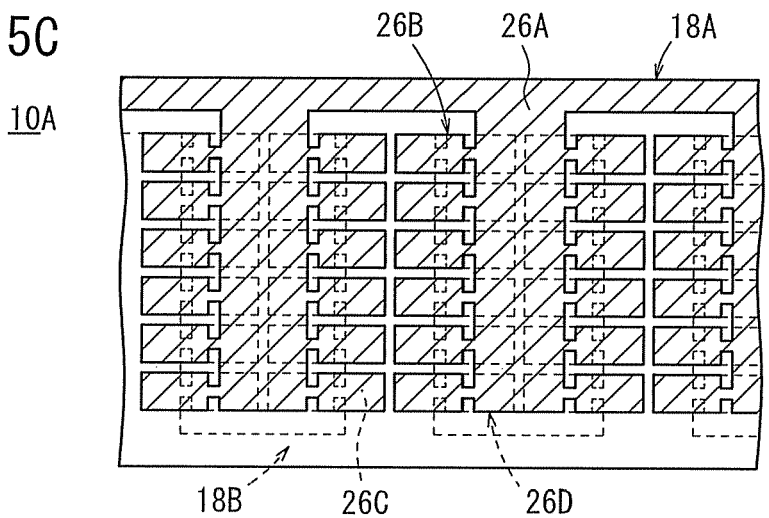
FIG. 5C is a transparent view, partly omitted from illustration, showing the first dielectric film and the second dielectric film, which are superposed one on the other, of the first film capacitor.

When the first dielectric film 22A and the second dielectric film 22B are rolled into the roll 12, as shown in FIGS. 3 and 5C, the first capacitor electrodes 26A of the first electrode pattern 18A and the fourth capacitor electrodes 26D of the second electrode pattern 18B are superposed one on the other with the first dielectric film 22A or the second dielectric film 22B being sandwiched therebetween. Similarly, the second capacitor electrodes 26B of the first electrode pattern 18A and the third capacitor electrodes 26C of the second electrode pattern 18B are superposed one on the other with the first dielectric film 22A or the second dielectric film 22B being sandwiched therebetween.

The first lead-out electrode 24A of the first electrode pattern 18A extends to a side edge 30a of the first dielectric film 22A such that the first lead-out electrode 24A is electrically connected to the first terminal 14. Similarly, the second lead-out electrode 24B of the second electrode pattern 18B extends to a side edge 32b of the second dielectric film 22B (opposite to the side edge 30a) such that the second lead-out electrode 24B is electrically connected to the second terminal 16.

The second capacitor electrodes 26B of the first electrode pattern 18A have a plurality of first sections 34 that are connected to opposite end faces 36a, 36b of the first capacitor electrodes 26A which extend transversely across the first dielectric film 22A, through narrow first fuses 38.

Similarly, the fourth capacitor electrodes 26D of the second electrode pattern 18B have a plurality of second sections 40 that are connected to opposite end faces 42a, 42b of the third capacitor electrodes 26C which extend transversely across the second dielectric film 22B, through narrow second fuses 44.

When the first film capacitor 10A suffers a fault, the first sections 34 and the second sections 40 can individually be electrically disconnected. Therefore, the first film capacitor 10A is prevented from undergoing a large reduction in the capacitance upon the fault. Since the wide first capacitor electrodes 26A are disposed between the first fuses 38 and the first lead-out electrode 24A, and the wide third capacitor electrodes 26C are disposed between the second fuses 44 and the second lead-out electrode 24B, the first capacitor electrodes 26A and the third capacitor electrodes 26C can be effectively utilized as heat radiation paths. In other words, the first film capacitor 10A has sufficient heat radiation paths, has an increased allowable current value, and finds itself usable in various applications.

Several modifications of the first film capacitor 10A will be described below with reference to FIGS. 6A through 8.

Figure 6A:
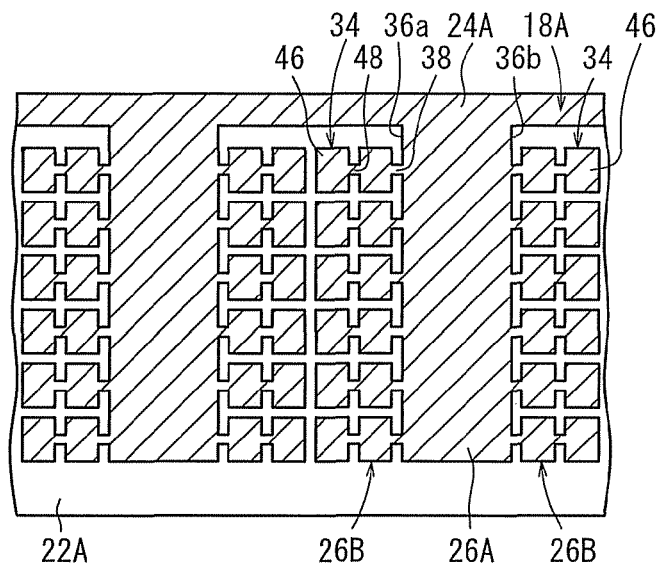
FIG. 6A is a plan view, partly omitted from illustration, of a first dielectric film and a first electrode pattern of a first modification of the first film capacitor.
Figure 6B:
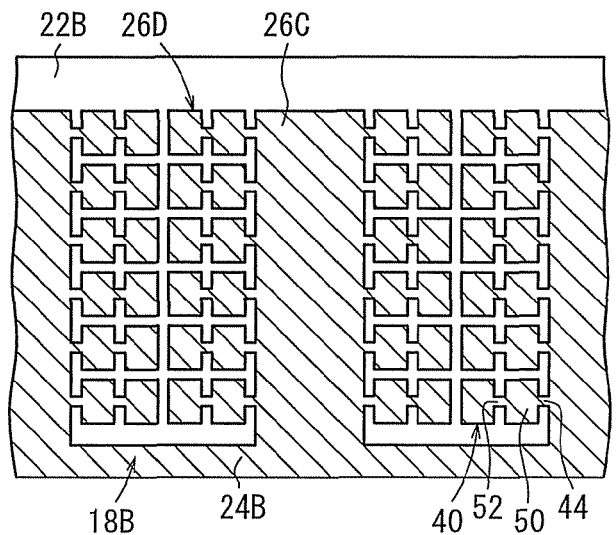
FIG. 6B is a plan view, partly omitted from illustration, of a second dielectric film and a second electrode pattern of the first modification of the first film capacitor.
Figure 6C:
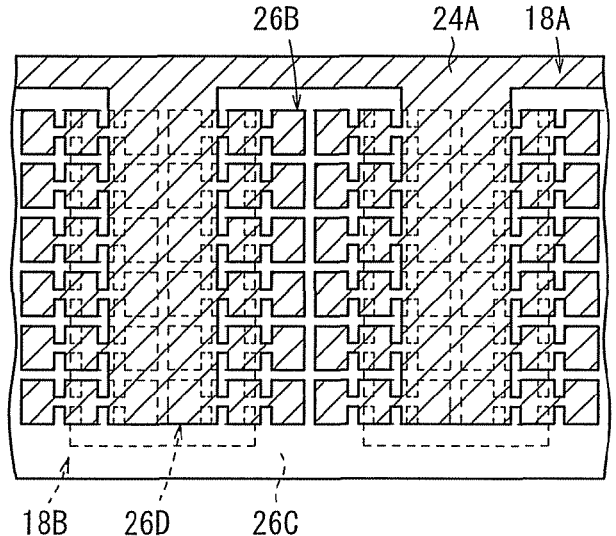
FIG. 6C is a transparent view, partly omitted from illustration, showing the first dielectric film and the second dielectric film, which are superposed one on the other, of the first modification of the first film capacitor.

As shown in FIGS. 6A through 6C, a film capacitor 10Aa according to a first modification is of a structure substantially similar to the first film capacitor 10A, but is different therefrom as to the structure of the first sections 34 and the second sections 40.

Each of the first sections 34 comprises a plurality of first small sections 46 arrayed along the longitudinal direction of the first dielectric film 22A and connected through narrow third fuses 48. Similarly, each of the second sections 40 comprises a plurality of second small sections 50 arrayed along the longitudinal direction of the second dielectric film 22B and connected by narrow fourth fuses 52.

The first capacitor electrodes 26A and the third capacitor electrodes 26C can also be effectively utilized as heat radiation paths. Particularly, since the first sections 34 and the second sections 40 are divided into the first small sections 46 and the second small sections 50, the first small sections 46 and the second small sections 50 can individually be electrically disconnected when the film capacitor 10Aa suffers a fault. The film capacitor 10Aa is prevented from undergoing a large reduction in the capacitance upon the fault.

Figure 7A:
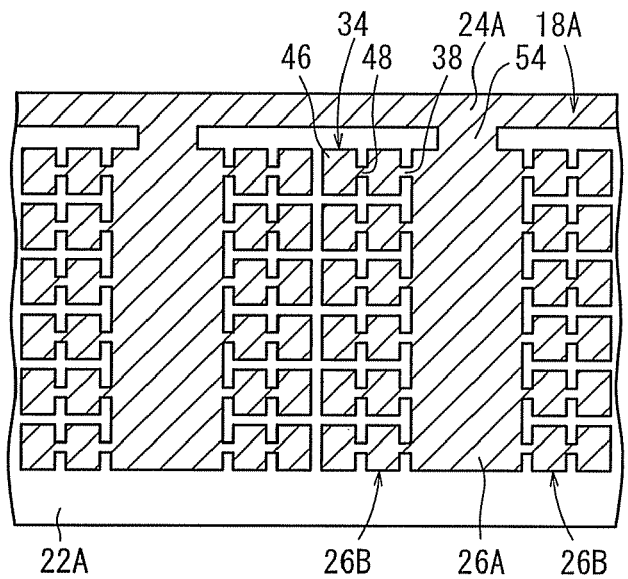
FIG. 7A is a plan view, partly omitted from illustration, of a first dielectric film and a first electrode pattern of a second modification of the first film capacitor.
Figure 7B:
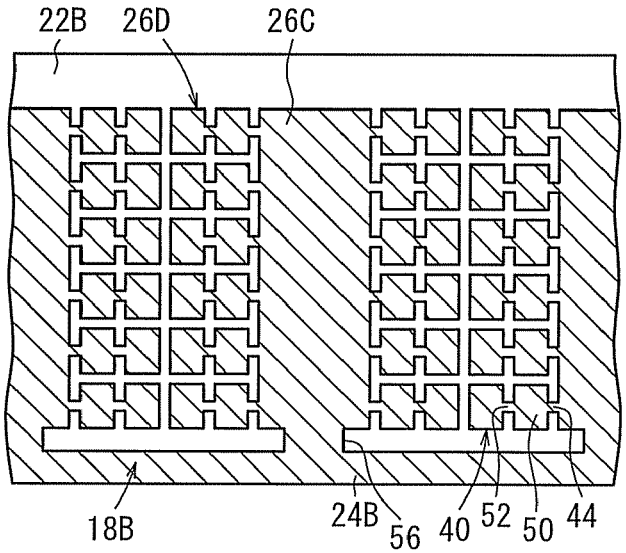
FIG. 7B is a plan view, partly omitted from illustration, of a second dielectric film and a second electrode pattern of the second modification of the first film capacitor.
Figure 7C:
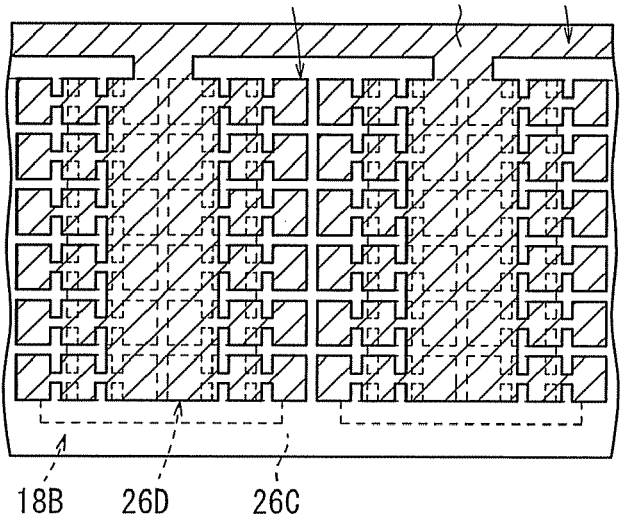
FIG. 7C is a transparent view, partly omitted from illustration, showing the first dielectric film and the second dielectric film, which are superposed one on the other, of the second modification of the first film capacitor.

As shown in FIGS. 7A through 7C, a film capacitor 10Ab according to a second modification is of a structure substantially similar to the film capacitor 10Aa according to the first modification, but is different therefrom as to the following features:

Fifth fuses 54 that are narrower than the first capacitor electrodes 26A and wider than the first fuses 38 are disposed between the first lead-out electrode 24A and the first capacitor electrodes 26A of the first electrode pattern 18A. Similarly, sixth fuses 56 that are narrower than the third capacitor electrodes 26C and wider than the second fuses 44 are disposed between the second lead-out electrode 24B and the third capacitor electrodes 26C of the second electrode pattern 18B.

Even when the film capacitor 10Ab suffers a defect in a wide range including one of the first capacitor electrodes 26A, for example, the first capacitor electrodes 26A can individually be electrically disconnected. The film capacitor 10Ab is thus prevented from undergoing a large reduction in the capacitance upon the fault.

Figure 8:
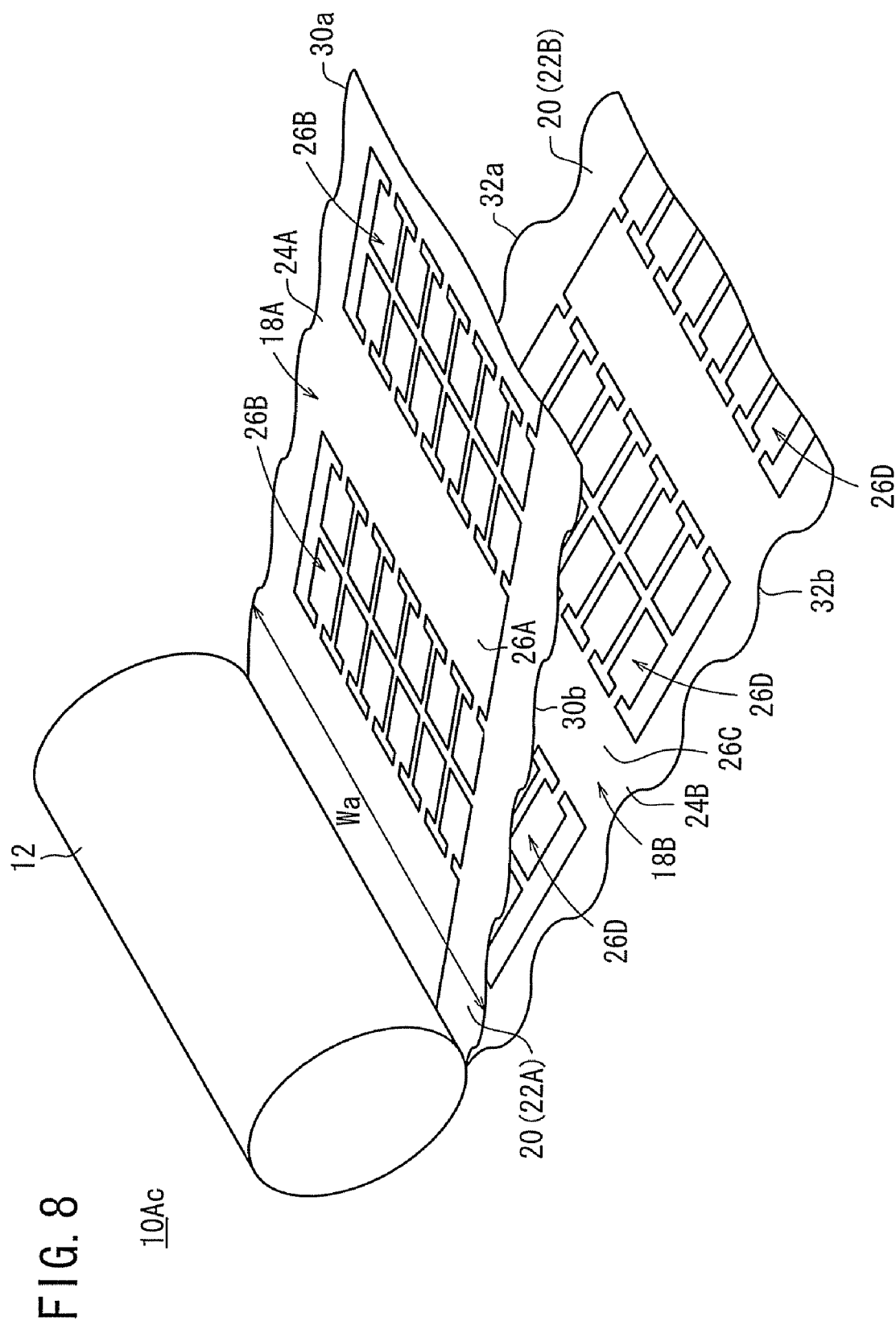
FIG. 8 is a perspective view, partly omitted from illustration, of the structure of a roll of a third modification of the first film capacitor.

As shown in FIG. 8, a film capacitor 10Ac according to a third modification is of a structure substantially similar to the first film capacitor 10A, but is different therefrom in that the side edges 30a, 30b of the first dielectric film 22A are of a wavy shape and the side edges 32a, 32b of the second dielectric film 22B are of a wavy shape. Though the wavy shapes are shown as being similar to a sine-wave shape in FIG. 8, they may be a shape similar to a triangular shape, a semicircular shape, or the like.

If the side edges 30a, 30b of the first dielectric film 22A and the side edges 32a, 32b of the second dielectric film 22B are straight, then when they are rolled into the roll 12, the first lead-out electrode 24A and the second lead-out electrode 24B are less liable to be exposed on the opposite ends of the roll 12, and may not well be electrically connected to the first terminal 14 and the second terminal 16. In addition, the ends of the roll 12 and the first and second terminals 14, 16 may have an adhesion problem.

However, since the side edges 30a, 30b of the first dielectric film 22A are of a wavy shape and the side edges 32a, 32b of the second dielectric film 22B are of a wavy shape, when they are rolled into the roll 12, the first lead-out electrode 24A and the second lead-out electrode 24B are more liable to be exposed on the opposite ends of the roll 12, and can well be electrically connected to the first terminal 14 and the second terminal 16, and the ends of the roll 12 can well adhere to the first and second terminals 14, 16. Accordingly, the film capacitor 10Ac can prevent a local large current from flowing thereinto and hence is highly reliable in operation.

A film capacitor according to a second embodiment of the present invention (hereinafter referred to as "second film capacitor 10B") will be described below with reference to FIGS. 9 and 10.

The second film capacitor 10B is of essentially the same structure as the first film capacitor 10A described above, but has a roll 12 which is different as described below.

Figure 9:
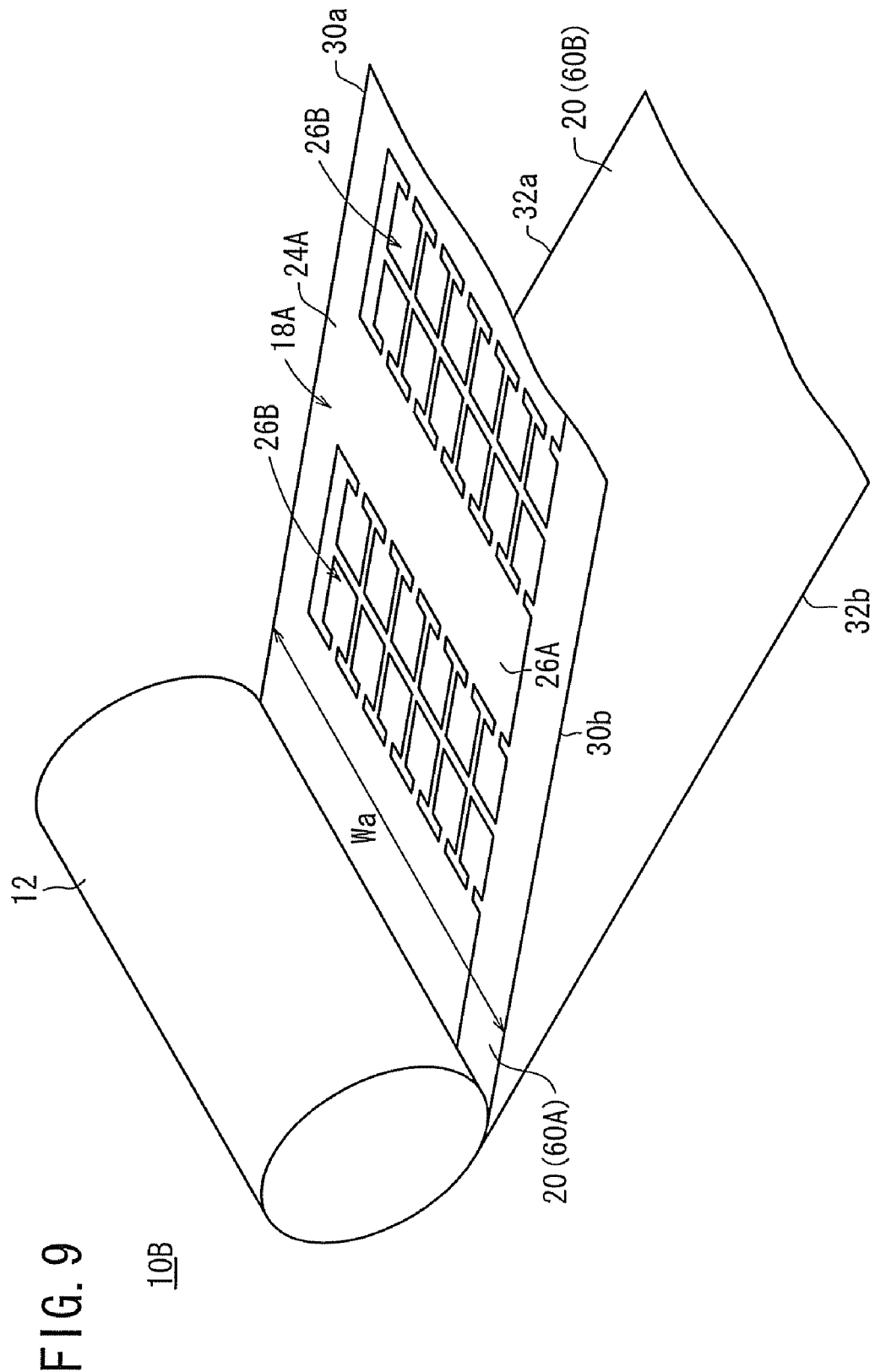
FIG. 9 is a perspective view, partly omitted from illustration, of the structure of a roll of a second film capacitor.
Figure 10:
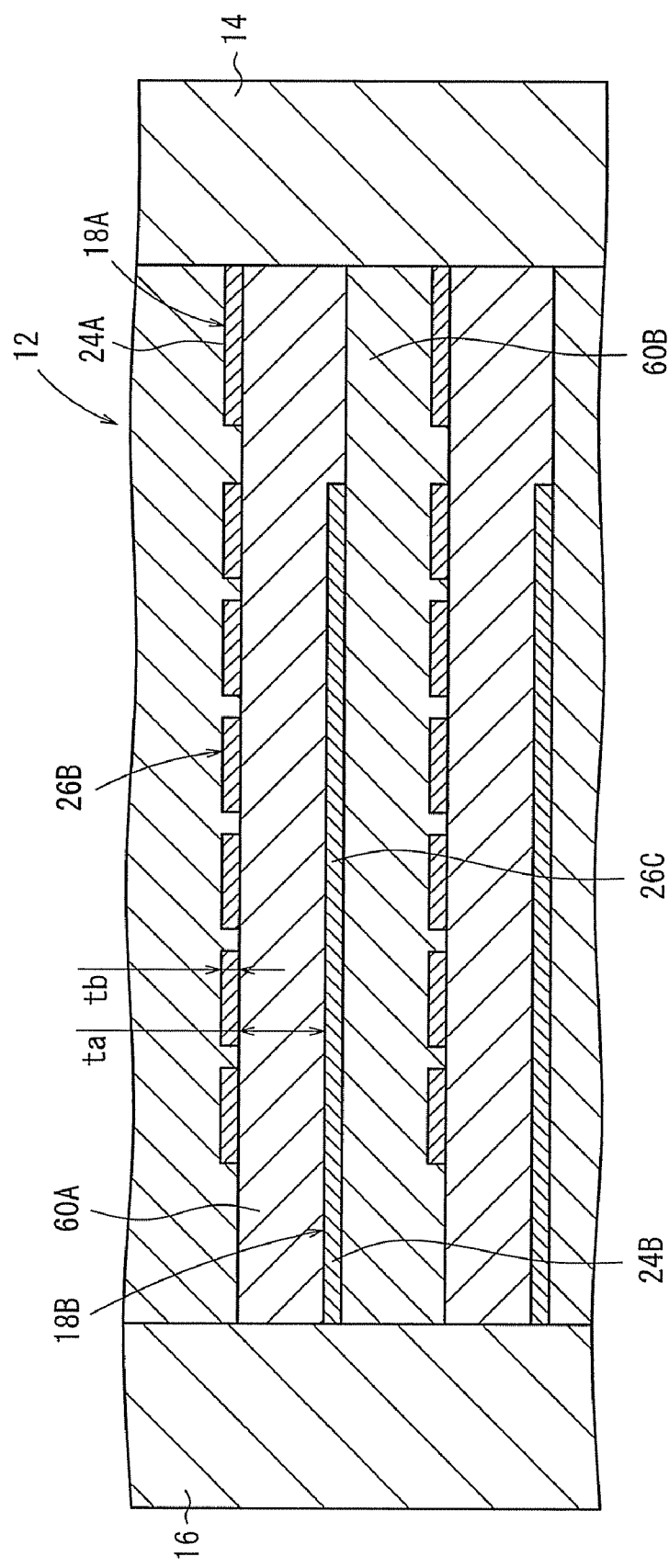
FIG. 10 is a cross-sectional view, partly omitted from illustration, of the structure of the second film capacitor.

As shown in FIGS. 9 and 10, the roll 12 of the second film capacitor 10B comprises a dielectric film 60A with the first electrode pattern 18A on one side thereof and the second electrode pattern 18B on the other side thereof, and a spacer 60B with no electrode pattern on either side thereof. The dielectric film 60A and the spacer 60B are superposed one on the other and rolled together.

Other structural details of the second film capacitor 10B are identical to those of the first film capacitor 10A and will not be described in detail below.

With the second film capacitor 10B, as with the first film capacitor 10A, the first sections 34 and the second sections 40 can individually be electrically disconnected. Therefore, the second film capacitor 10B is prevented from undergoing a large reduction in the capacitance in the event of a fault. Since the wide first capacitor electrodes 26A are disposed between the first fuses 38 and the first lead-out electrode 24A, and the wide third capacitor electrodes 26C are disposed between the second fuses 44 and the second lead-out electrode 24B, the first capacitor electrodes 26A and the third capacitor electrodes 26C can be effectively utilized as heat radiation paths. In other words, the second film capacitor 10B has sufficient heat radiation paths, has an increased allowable current value, and finds itself usable in various applications.

The second film capacitor 10B may be modified in the same manner as with the film capacitor 10Aa according to the first modification through the film capacitor 10Ac according to the third modification.

The film capacitor according to the present invention is not limited to the above embodiments, but various changes and modifications may be made therein without departing from the scope of the invention.

The invention claimed is:

1. A film capacitor including a self-healing function and a self-protection mechanism, comprising:

a roll of a first electrode pattern and a second electrode pattern which confront each other with a dielectric film sandwiched therebetween;
a first terminal electrically connected to one end of the roll; and
a second terminal electrically connected to another end of the roll, wherein the first electrode pattern includes a first lead-out electrode extending continuously in a longitudinal direction of the dielectric film, a plurality of first capacitor electrodes extending substantially perpendicularly from the first lead-out electrode, and a plurality of second capacitor electrodes disposed between the first capacitor electrodes and connected to the first capacitor electrodes;
the second electrode pattern includes a second lead-out electrode extending continuously in the longitudinal direction of the dielectric film, a plurality of third capacitor electrodes extending substantially perpendicularly from the second lead-out electrode, and a plurality of fourth capacitor electrodes disposed between the third capacitor electrodes and connected to the third capacitor electrodes;
the first capacitor electrodes of the first electrode pattern and the fourth capacitor electrodes of the second electrode pattern are superposed one on the other with the dielectric film being sandwiched therebetween, and the second capacitor electrodes of the first electrode pattern and the third capacitor electrodes of the second electrode pattern are superposed one on the other with the dielectric film being sandwiched therebetween;
the width of the fourth capacitor electrodes along the longitudinal direction of the dielectric film is greater than the width of the first capacitor electrodes along the longitudinal direction of the dielectric film, and the width of the second capacitor electrodes along the longitudinal direction of the dielectric film is greater than the width of the third capacitor electrodes along the longitudinal direction of the dielectric film;
the first lead-out electrode of the first electrode pattern extends to a side edge of the dielectric film such that the first lead-out electrode is electrically connected to the first terminal; and
the second lead-out electrode of the second electrode pattern extends to another side edge of the dielectric film such that the second lead-out electrode is electrically connected to the second terminal.

2. A film capacitor according to claim 1, wherein the roll comprises a first dielectric film with the first electrode pattern disposed on one side thereof and a second dielectric film with the second electrode pattern disposed on one side thereof, the first dielectric film and the second dielectric film being superposed one on the other such that the first electrode pattern and the second electrode pattern are kept out of contact with each other, and rolled together.

3. A film capacitor according to claim 1, wherein the roll comprises a dielectric film with the first electrode pattern disposed on one side thereof and the second electrode pattern disposed on another side thereof, and a spacer of a dielectric film with no electrode pattern disposed on either side thereof, the dielectric film and the spacer being superposed one on the other and rolled together.

4. A film capacitor according to claim 1, wherein the dielectric film has wavy side edges.

5. A film capacitor according to claim 1, wherein the second capacitor electrodes of the first electrode pattern are divided into at least one first section;

the at least one first section is connected through a narrow first fuse to at least one end face of the first capacitor electrodes which extends transversely across the dielectric film;

the fourth capacitor electrodes of the second electrode pattern are divided into at least one second section; and the at least one second section is connected through a narrow second fuse to at least one end face of the third capacitor electrodes which extends transversely across the dielectric film.

6. A film capacitor according to claim 5, wherein the first section comprises at least two first small sections arrayed along the longitudinal direction of the dielectric film and connected through narrow third fuses, and the second section comprises at least two second small sections arrayed along the longitudinal direction of the dielectric film and connected through narrow fourth fuses.

7. A film capacitor according to claim 5, wherein a fifth fuse that is narrower than the first capacitor electrodes and wider than the first fuse is disposed between the first lead-out electrode and the first capacitor electrodes of the first electrode pattern, and a sixth fuse that is narrower than the third capacitor electrodes and wider than the second fuse is disposed between the second lead-out electrode and the second third capacitor electrodes of the second electrode pattern.

* * * * *

UNITED STATES PATENT AND TRADEMARK OFFICE
CERTIFICATE OF CORRECTION

| | | |
|---|---|---|
| PATENT NO. | : 7,929,271 B2 | Page 1 of 1 |
| APPLICATION NO. | : 12/298372 | |
| DATED | : April 19, 2011 | |
| INVENTOR(S) | : Yoshikuni Kato, Katsuo Koizumi and Kanji Machida | |

It is certified that error appears in the above-identified patent and that said Letters Patent is hereby corrected as shown below:

Column 10

*Line 12*: delete the second occurrence of "second"

Signed and Sealed this
Ninth Day of August, 2011

David J. Kappos
*Director of the United States Patent and Trademark Office*